E. C. HORST.
HOP SEPARATING CYLINDER.
APPLICATION FILED JUNE 25, 1912.
1,054,120.
Patented Feb. 25, 1913.
2 SHEETS—SHEET 2.
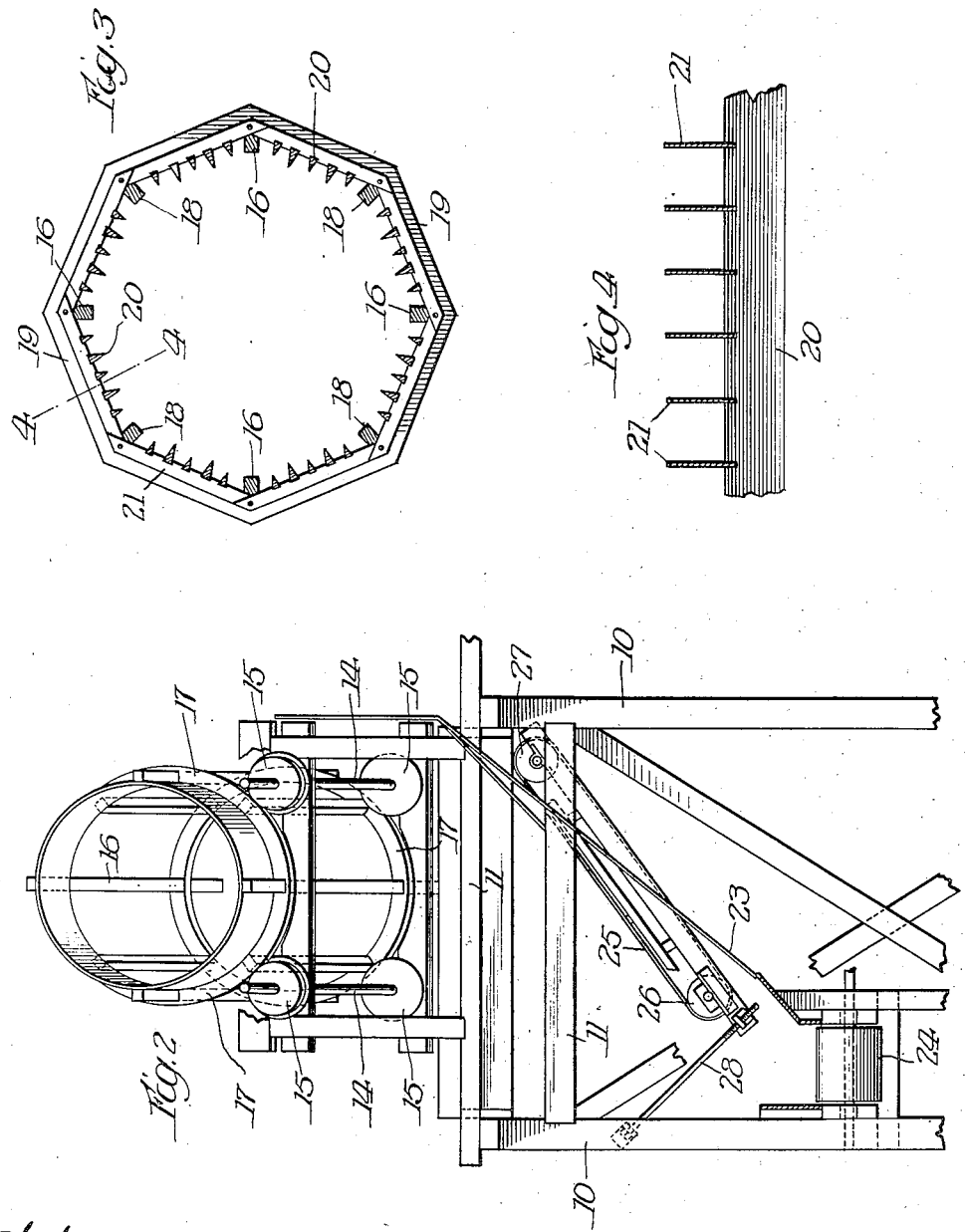

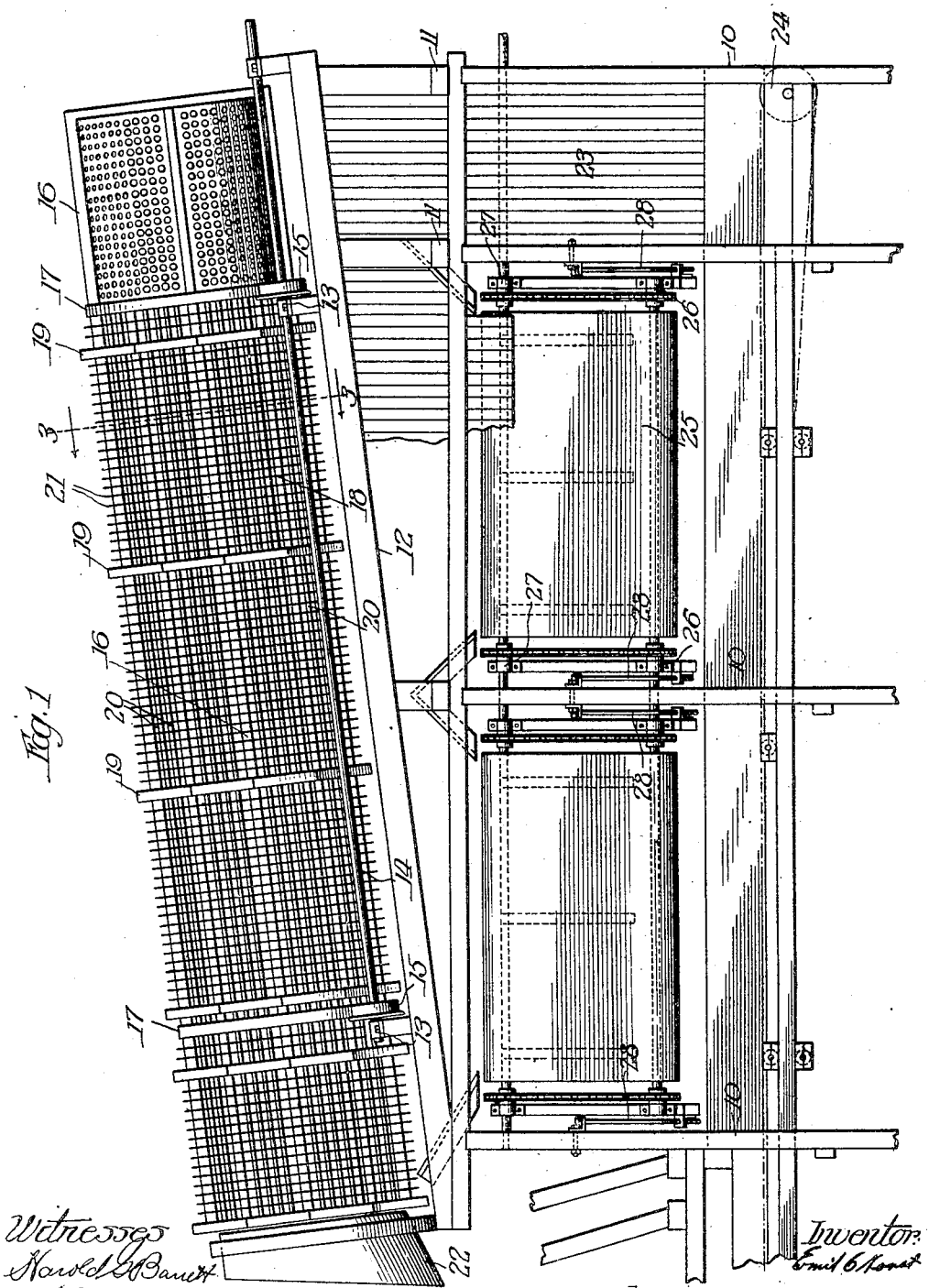

UNITED STATES PATENT OFFICE.

EMIL CLEMENS HORST, OF SAN FRANCISCO, CALIFORNIA, ASSIGNOR TO E. CLEMENS HORST COMPANY, OF SAN FRANCISCO, CALIFORNIA, A CORPORATION OF NEW JERSEY.

HOP-SEPARATING CYLINDER.

1,054,120.  Specification of Letters Patent.  Patented Feb. 25, 1913.

Application filed June 25, 1912. Serial No. 705,769.

*To all whom it may concern:*

Be it known that I, EMIL CLEMENS HORST, a citizen of the United States, residing at San Francisco, in the county of San Francisco, in the State of California, have invented certain new and useful Improvements in Hop-Separating Cylinders, of which the following is a specification.

My invention relates to a machine for picking hops and particularly to an apparatus adapted to separate the picked hops from the leaves and trash combined therewith after passing through a picker such as is shown in my co-pending application, Serial No. 563,420, filed May 25th, 1910.

It will be understood that a picking machine such as referred to and similar to that shown in my co-pending application is adapted to receive at one end the hop vines which are approximately six feet in length and have many leaves. These vines are attached to a conveyer and passed between picking drums whereby the hops are removed from the vines. It has been found that in the process of removing hops many leaves and stems are also removed and passed out with the hops in the conveyer.

Therefore, the purpose of the present machine is to separate the leaves and trash from the hops. This is accomplished in the herein described machine by the employment of a cylinder, preferably octagonal in cross section, this cylinder having associated therewith a separating belt and a sheet metal deflector.

My invention will be more readily understood by reference to the accompanying drawings wherein—

Figure 1 is a side elevation of a machine such as above described; Fig. 2 is an end elevation thereof; Fig. 3 is a section on line 3, 3 of Fig. 1, and Fig. 4 is a detail showing the slat attaching means.

Referring more particularly to the drawings it will be seen that I mount my machine on suitable vertical supports 10, and transverse supports 11. Angularly positioned members 12 are provided on the frame work just referred to and on the members 12 are provided bearings 13 in which are mounted longitudinally extending shafts 14 carrying flanged wheels 15. The shafts may be connected to any suitable source of power.

Mounted above the members 12 is the separating cylinder of my invention. The frame work of this cylinder is preferably formed of four longitudinally extending bars 16. These bars are bolted to circular iron rings 17, these rings resting upon the wheels 15, the rotation of the cylinder being accomplished by this means. A plurality of shorter longitudinally extending bars 18 are provided, these extending from the upper ring 17 to the lower end of the cylinder. The eight longitudinally extending bars are securely connected by means of octagonal wooden rings 19. Between the upper metal ring and the upper end of the cylinder, I prefer to place a circular perforated metal cylinder, the perforations being of fairly large size, one to one and a half inches in diameter. The remainder of the cylinder is completed by means of triangularly shaped, longitudinally extending slats 20. These slats as shown in Fig. 3, are of different sizes, that is, I provide three of the smaller size and two of the larger size between each of the longitudinally extending bars 16, 18. The slats are held in place by means of the metal strips 21, which are fitted within saw-cuts in one edge of the triangular slats. This is best shown in Fig. 4. The sheet metal strips are also shown in Fig. 1. This cylinder at its lower end terminates in a sheet metal chute 22, non-rotatably mounted on the frame work of the machine. Any hops which have not been separated or which are still in clusters pass through the chute 22, into a novel cluster machine, application for patent for which is filed of even date herewith.

Mounted underneath the cylinder heretofore described and particularly beneath the circular perforated metal portion thereof is an inclined sheet metal deflector 23. Any hops passing through the perforations in the sheet metal cylinder fall upon this deflector and pass directly into a clean hop conveyer 24. Also mounted beneath the cylinder and particularly beneath the remaining portion thereof is a belt separator such as shown in my co-pending application heretofore referred to. This separator is composed of an endless strip of material such as burlap or canvas 25, this being passed over rollers 26, 27 at either end. An adjusting bolt 28 is provided in order to adjust the angle of inclination of the separator belt.

The hops and leaves are inserted in the cylinder at its upper end by means of a suitable conveyer, not shown. Many of the hops will fall through the perforations in the sheet metal perforated portion of the cylinder dropping from there onto the deflector and from there to the clean hop conveyer. The remainder of the hops, leaves and trash pass into the octagonal portion of the cylinder where they are agitated and continually work downward as the cylinder revolves. Single hops and some small leaves continue to fall out through the interstices formed by the triangular wooden slats and sheet iron strips along the full length of the lower portion of the revolving cylinder. The few leaves that do go through the interstices are taken out by the upward traveling separator belts and discharged beyond the same to be removed as rubbish while the clean hops roll down into the conveyer by which they are taken either to kilns to be dried or, as the case may be, to a sacking spout if it is desired to remove the picked hops to drying kilns not contiguous to the machines.

The particular advantage of the triangular slats and the octagonal cross section of the cylinder resides in the fact that the hops, leaves and clusters are continually agitated and prevented from becoming clogged, all the hops being given an opportunity to escape through the interstices.

I claim:

1. A hop separating device comprising, in combination, a support, a drum mounted on said support and at an angle to the horizontal, said drum being polygonal in cross section and provided with a plurality of perforations, said perforations being formed by intersecting longitudinally extending pointed members and transversely extending strips, some of the longitudinally extending pointed members being of smaller size than the remainder thereof, substantially as described.

2. A hop separating device comprising, in combination, a support, a drum mounted on said support and at an angle to the horizontal, said drum having for a portion of its length a circular portion provided with perforations, the remainder of the drum being polygonal in cross section and provided also with perforations, said perforations being formed by intersecting longitudinally extending pointed members and transversely extending strips, said strips being part of the means employed for securing the longitudinally extending members in place, substantially as described.

3. A hop separating device comprising, in combination, a support, a drum mounted on said support and at an angle to the horizontal, said drum being circular in cross section for a portion of its length and polygonal in cross section for the remainder of its length, said drum having perforations over its entire surface, triangular shaped portions extending within the drum throughout part of its length, and means beneath said drum adapted for further separation of the hops, substantially as described.

EMIL CLEMENS HORST.

Witnesses:
CALVIN T. MILANS,
HERBERT S. SHEPARD.